(12) United States Patent
Marubashi et al.

(10) Patent No.: US 12,484,633 B2
(45) Date of Patent: Dec. 2, 2025

(54) INHALATION DEVICE CONTROLLER

(71) Applicant: Japan Tobacco Inc., Tokyo (JP)

(72) Inventors: Keiji Marubashi, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 1304 days.

(21) Appl. No.: 17/195,652

(22) Filed: Mar. 9, 2021

(65) Prior Publication Data

US 2021/0282466 A1    Sep. 16, 2021

(30) Foreign Application Priority Data

Mar. 12, 2020  (JP) ................................ 2020-043278

(51) Int. Cl.
*A24F 40/57* (2020.01)
*A24F 40/10* (2020.01)
*A24F 40/53* (2020.01)
*G05D 23/20* (2006.01)
*G05D 23/24* (2006.01)
*H05B 1/02* (2006.01)

(52) U.S. Cl.
CPC .............. *A24F 40/57* (2020.01); *A24F 40/10* (2020.01); *A24F 40/53* (2020.01); *G05D 23/2033* (2013.01); *G05D 23/2401* (2013.01); *H05B 1/0244* (2013.01)

(58) Field of Classification Search
CPC .......... A24F 40/57; A24F 40/53; A24F 40/10; G05D 23/2033; G05D 23/2401; H05B 1/0244
USPC ......................................... 219/497, 499, 110
See application file for complete search history.

(56) References Cited

U.S. PATENT DOCUMENTS

| 8,915,254 B2 * | 12/2014 | Monsees ................. A24F 40/40 |
| | | 131/194 |
| 8,991,402 B2 | 3/2015 | Bowen et al. |
| 10,015,986 B2 | 7/2018 | Cadieux et al. |

(Continued)

FOREIGN PATENT DOCUMENTS

| CN | 108025149 A | 5/2018 |
| EP | 2257195 B1 | 6/2012 |

(Continued)

OTHER PUBLICATIONS

Office Action mailed on Jun. 15, 2020, received for JP Application 2020-043278, 7 pages including English Translation.

(Continued)

*Primary Examiner* — Eric S Stapleton
*Assistant Examiner* — Yeong Juen Thong
(74) *Attorney, Agent, or Firm* — XSENSUS LLP

(57) ABSTRACT

An inhalation device controller is configured to control an atomizer including a container configured to hold an aerosol source of a liquid, a heater, and a transport portion configured to transport the aerosol source from the container to a heating area by the heater. The controller includes a control circuit configured to monitor a physical amount correlated with a temperature of the heater and configured to control power to be supplied to the atomizer such that the physical amount under monitoring approaches a target value. The target value is set such that the temperature of the heater during heating of the aerosol source falls within a range of 210° C. to 230° C.

7 Claims, 12 Drawing Sheets

(56) References Cited

U.S. PATENT DOCUMENTS

| | | |
|---|---|---|
| 10,058,129 B2 | 8/2018 | Monsees et al. |
| 10,076,139 B2 | 9/2018 | Monsees et al. |
| 10,206,429 B2 | 2/2019 | Davis et al. |
| 10,231,484 B2 | 3/2019 | Bowen et al. |
| 10,321,718 B2 | 6/2019 | Qiu |
| 10,660,363 B2 | 5/2020 | Cadieux et al. |
| 11,134,544 B2 | 9/2021 | Chang et al. |
| 2009/0151717 A1 | 6/2009 | Bowen et al. |
| 2015/0157056 A1 | 6/2015 | Bowen et al. |
| 2016/0021934 A1 | 1/2016 | Cadieux et al. |
| 2017/0020190 A1 | 1/2017 | Chang et al. |
| 2017/0020193 A1 | 1/2017 | Davis et al. |
| 2017/0280779 A1 | 10/2017 | Qiu |
| 2018/0110939 A1* | 4/2018 | Lanzkowsky ........ A61K 31/675 |
| 2018/0289071 A1 | 10/2018 | Cadieux et al. |
| 2019/0166915 A1* | 6/2019 | Nagata .................. A61M 15/06 |
| 2019/0246699 A1 | 8/2019 | Qiu |
| 2019/0261686 A1 | 8/2019 | Bowen et al. |
| 2019/0274353 A1* | 9/2019 | Sur ........................ A61M 15/06 |
| 2019/0388632 A1* | 12/2019 | Krasnow ............... A61M 16/14 |
| 2020/0022412 A1* | 1/2020 | Abi Aoun ................ G01K 7/16 |
| 2020/0275706 A1 | 9/2020 | Cadieux et al. |
| 2020/0278707 A1* | 9/2020 | Sur .......................... H05B 3/16 |
| 2021/0161214 A1* | 6/2021 | Bilat ....................... A24F 40/53 |
| 2021/0385909 A1 | 12/2021 | Chang et al. |
| 2022/0183377 A1* | 6/2022 | Blandino ................ A24F 40/57 |

FOREIGN PATENT DOCUMENTS

| | | |
|---|---|---|
| JP | 2000-41654 A | 2/2000 |
| JP | 5739800 B2 | 6/2015 |
| JP | 2017-525348 A | 9/2017 |
| JP | 2017-221213 A | 12/2017 |
| JP | 2018-528762 A | 10/2018 |
| JP | 2019-103506 A | 6/2019 |
| WO | 2017/019402 A1 | 2/2017 |
| WO | 2017/205692 A1 | 11/2017 |
| WO | 2018/025380 A1 | 2/2018 |

OTHER PUBLICATIONS

Decision of Refusal mailed on Nov. 9, 2020, received for JP Application 2020-043278, 4 pages including English Translation.
Extended European Search Report issued Aug. 9, 2021 in European Patent Application No. 21159898.2, 9 pages.
Chinese Office Action issued Jan. 9, 2024 in corresponding Chinese Patent Application No. 202110238777.1, 13 pages.

* cited by examiner

FIG. 7

INHALATION DEVICE CONTROLLER

CROSS-REFERENCE TO RELATED APPLICATION

The present invention contains subject matter related to Japanese Patent Application No. 2020-043278 filed in the Japan Patent Office on Mar. 12, 2020, the entire contents of which are incorporated herein by reference.

BACKGROUND OF THE INVENTION

Field of the Invention

The present invention relates to an inhalation device controller.

Description of the Related Art

There have been proposed various methods to control the temperature of the heater of an inhalation device such as an electronic cigarette. Japanese Patent Laid-Open No. 2017-221213 describes setting a target temperature to heat a high-viscosity material in a device to about 100° C. (inclusive) to about 200° C. (inclusive). Japanese Patent No. 5739800 describes a technique of adjusting electric energy to be supplied to a heater to keep the actual operation temperature of the heater at a temperature lower than a predetermined maximum operation temperature. Japanese Patent Laid-Open No. 2000-041654 describes a technique of on/off-controlling energization to a heater based on a change of the resistance value of the heater that heats a molded body of a flavor material.

In an inhalation device that uses an aerosol source of a liquid, the aerosol source of a liquid is carried by a porous body called a wick to the vicinity of the heater and heated there. Heat from the heater decreases until reaching the aerosol source. To generate an appropriate amount of aerosol from the aerosol source, the temperature of the heater is preferably controlled in consideration of such a loss of heat.

SUMMARY OF THE INVENTION

An aspect of the present disclosure provides a technique advantageous in controlling a heater configured to heat an aerosol source of a liquid.

According to a first embodiment, there provided is an inhalation device controller configured to control an atomizer including a container configured to hold an aerosol source of a liquid, a heater, and a transport portion configured to transport the aerosol source from the container to a heating area by the heater, the controller comprising a control circuit configured to monitor a physical amount correlated with a temperature of the heater and configured to control power to be supplied to the atomizer such that the physical amount under monitoring approaches a target value, wherein the target value is set such that the temperature of the heater during heating of the aerosol source falls within a range of 210° C. to 230° C.

According to a second embodiment, the control circuit switches a supply amount of the power to the atomizer based on a comparison result between the physical amount under monitoring and the target value.

According to a third embodiment, the control circuit is configured such that the temperature of the heater falls within the range of 210° C. to 230° C. even if the aerosol source does not exist in the heating area.

According to a fourth embodiment, if the physical amount under monitoring reaches a value representing that the temperature of the heater is not less than 230° C., the control circuit stops the supply of the power to the atomizer.

According to a fifth embodiment, the control circuit includes: an operational amplifier including a noninverting input terminal connected to a first terminal of the heater, and an inverting input terminal connected to a second terminal of the heater; and a microcontroller configured to compare an output of the operational amplifier, which is converted into a digital form, with the target value stored in a digital form in a memory to monitor the output of the operational amplifier as the physical amount.

According to a sixth embodiment, the microcontroller calculates the target value based on the output of the operational amplifier in a state in which the heater is not heated, and stores the target value in the memory.

According to a seventh embodiment, the controller further comprises a voltage generation circuit configured to generate the power to be supplied to the atomizer, and the control circuit further includes a transistor connected between the voltage generation circuit and the heater, and the microcontroller supplies a signal based on a comparison result between the output of the operational amplifier and the target value to a control terminal of the transistor.

According to an eighth embodiment, the controller further comprises a voltage generation circuit configured to generate the power to be supplied to the atomizer, and the physical amount is a voltage at a first terminal of the heater, the control circuit includes: a first resistor and a first transistor, which are connected in series between the voltage generation circuit and the first terminal of the heater; a second resistor and a second transistor, which are connected in series between the voltage generation circuit and the first terminal of the heater; a first comparator including a noninverting input terminal to which the target value is supplied, and an inverting input terminal connected to the first terminal of the heater; a second comparator including a noninverting input terminal connected to the first terminal of the heater, and an inverting input terminal to which the target value is supplied, a resistance value of the second resistor is higher than a resistance value of the first resistor, an output of the first comparator is supplied to a control terminal of the first transistor, and an output of the second comparator is supplied to a control terminal of the second transistor.

According to a ninth embodiment, the controller further comprises a voltage generation circuit configured to generate the power to be supplied to the atomizer, and the physical amount is a voltage at a first terminal of the heater, the control circuit includes: a first resistor and a first transistor, which are connected in series to the first terminal of the heater; a second resistor and a second transistor, which are connected in series to the first terminal of the heater; a first comparator including a noninverting input terminal to which the target value is supplied, and an inverting input terminal connected to the first terminal of the heater; a second comparator including a noninverting input terminal connected to the first terminal of the heater, and an inverting input terminal to which the target value is supplied, a resistance value of the second resistor is higher than a resistance value of the first resistor, an output of the first comparator is supplied to a control terminal of the first transistor, and an output of the second comparator is supplied to a control terminal of the second transistor.

According to a tenth embodiment, the control circuit further includes a microcontroller configured to convert the target value stored in a digital form in a memory into an analog form, and supply the target value in the analog form to the first comparator and the second comparator.

According to an eleventh embodiment, the memory stores a first target value and a second target value smaller than the first target value, the first target value is supplied as the target value while the first transistor is on, and the second target value is supplied as the target value while the second transistor is on.

According to a twelfth embodiment, the control circuit further includes a third transistor and a fourth transistor, the first target value is supplied from the microcontroller to the first comparator and the second comparator via the third transistor, the second target value is supplied from the microcontroller to the first comparator and the second comparator via the fourth transistor, the output of the first comparator is further supplied to a control terminal of the third transistor, and the output of the second comparator is further supplied to a control terminal of the fourth transistor.

According to a thirteenth embodiment, the control circuit further includes: a first capacitor connected to a node between the microcontroller and the third transistor to hold the first target value; and a second capacitor connected to a node between the microcontroller and the fourth transistor to hold the second target value.

According to a fourteenth embodiment, the control circuit further comprises an operational amplifier including a non-inverting input terminal connected to a first terminal of the heater, and an inverting input terminal connected to a second terminal of the heater; and the microcontroller calculates the first target value and the second target value based on an output of the operational amplifier in a state in which the first transistor is off and the second transistor is on, and stores the first target value and the second target value in the memory.

According to a fifteenth embodiment, the control circuit further includes: a third transistor; a fourth transistor; a first voltage dividing circuit configured to generate the first target value; and a second voltage dividing circuit configured to generate the second target value, the first target value is supplied as the target value from the first voltage dividing circuit to the first comparator and the second comparator via the third transistor, the second target value is supplied as the target value from the second voltage dividing circuit to the first comparator and the second comparator via the fourth transistor, the output of the first comparator is further supplied to a control terminal of the third transistor, and the output of the second comparator is further supplied to a control terminal of the fourth transistor.

According to a sixteenth embodiment, the control circuit further includes: a first delay circuit connected to a node between an output terminal of the first comparator and the control terminal of the first transistor; and a second delay circuit connected to a node between an output terminal of the second comparator and the control terminal of the second transistor.

According to a seventeenth embodiment, there provided is an inhalation device controller configured to control an atomizer including a container configured to hold an aerosol source of a liquid, a heater, and a transport portion configured to transport the aerosol source from the container to a heating area by the heater, the controller comprising: a voltage generation circuit configured to generate power to be supplied to the atomizer; and a control circuit configured to monitor a physical amount correlated with a temperature of the heater and configured to control the power to be supplied from the voltage generation circuit to the atomizer such that the physical amount under monitoring approaches a target value, wherein the control circuit includes an analog circuit and does not include a digital circuit.

BRIEF DESCRIPTION OF THE DRAWINGS

FIG. 7 is a view for explaining a control circuit according to the second arrangement example of the present invention;

DESCRIPTION OF THE EMBODIMENTS

Figure 1:
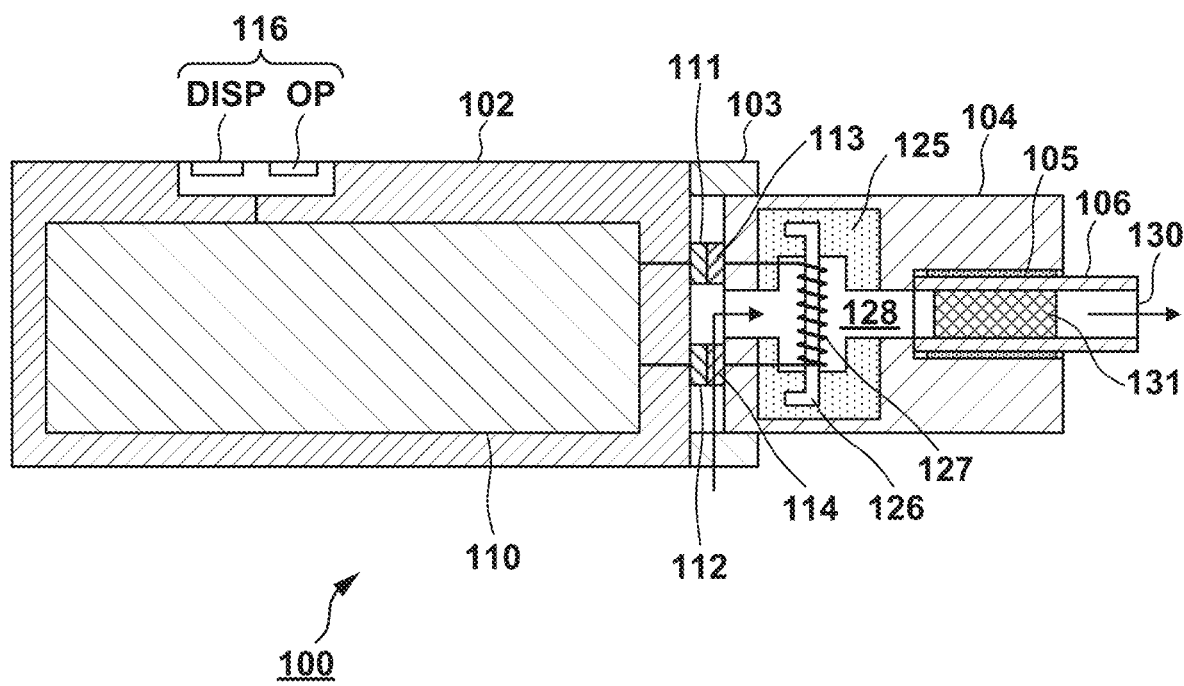
FIG. 1 is a view for explaining an arrangement example of an inhalation device according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 schematically shows the arrangement of an inhalation device 100 according to an embodiment. The inhalation device 100 may be configured to provide a gas containing an aerosol or a gas containing an aerosol and a flavor substance to a user via a mouthpiece portion 130 in accordance with an inhalation operation of the user. The inhalation device 100 may include a controller 102 and an atomizer 104. The inhalation device 100 may include a holding portion 103 that holds the atomizer 104 in a detachable state. The controller 102 may be understood as an inhalation device controller. The atomizer 104 may be configured to atomize an aerosol source. The aerosol source may be, for example, a liquid such as a polyhydric alcohol such as glycerin or propylene glycol. Alternatively, the aerosol source may contain medicine. The aerosol source may be a liquid, a solid, or a mixture of a liquid and a solid. A vapor source such as water may be used in place of the aerosol source.

The inhalation device 100 may further include a capsule 106 including a flavor source 131, and the atomizer 104 may include a capsule holder 105 that holds the capsule 106 in a detachable state. The flavor source 131 may be, for example, a molded body formed by molding a tobacco material. Alternatively, the flavor source 131 may be formed by a plant (for example, mint, herb, Chinese herb, coffee bean, and the like) other than tobacco. A flavor such as menthol may be added to the flavor source. The flavor source 131 may be added to the aerosol source. Note that the capsule holder 105 may be included not in the atomizer 104 but in the controller 102.

The controller 102 may include an electric component 110. The electric component 110 may include a user interface 116. Alternatively, it may be understood that the controller 102 includes the electric component 110 and the user interface 116. The user interface 116 may include, for example, a display unit DISP (for example, a light emitting element such as an LED and/or an image display device such as an LCD) and/or an operation unit OP (for example, a switch such as a button switch and/or a touch display).

The holding portion 103 of the controller 102 may include a first electrical contact 111 and a second electrical contact 112. In a state in which the atomizer 104 is held by the holding portion 103, the first electrical contact 111 of the holding portion 103 may contact a third electrical contact 113 of the atomizer 104, and the second electrical contact 112 of the holding portion 103 may contact a fourth electrical contact 114 of the atomizer 104. The controller 102 may supply power to the atomizer 104 via the first electrical contact 111 and the second electrical contact 112.

The atomizer 104 may include the third electrical contact 113 and the fourth electrical contact 114 described above. In addition, the atomizer 104 may include a heater 127 that heats the aerosol source, a container 125 that holds the aerosol source of a liquid, and a transport portion 126 that transports the aerosol source held by the container 125 to a heating area by the heater 127. The transport portion 126 may also be called a wick. At least a part of the heating area of the heater 127 may be arranged in a channel 128 provided in the atomizer 104. The first electrical contact 111, the third electrical contact 113, the heater 127, the fourth electrical contact 114, and the second electrical contact 112 form a current path configured to flow a current to the heater 127. The transport portion 126 may be made of, for example, a fiber material or a porous material.

As described above, the atomizer 104 may include the capsule holder 105 that detachably holds the capsule 106. In an example, the capsule holder 105 may hold the capsule 106 such that a part of the capsule 106 is stored in the capsule holder 105 or the atomizer 104, and the other part is exposed. The user may inhale a gas containing an aerosol by holding the mouthpiece portion 130 in the mouth. When the detachable capsule 106 includes the mouthpiece portion 130, the inhalation device 100 can be kept clean.

When the user holds the mouthpiece portion 130 in the mouth and performs an inhalation operation, air flows into the channel 128 of the atomizer 104, and an aerosol generated by heating the aerosol source by the heater 127 is transported to the mouthpiece portion 130, as indicated by arrows. In the arrangement in which the flavor source 131 is arranged, a flavor substance generated from the flavor source 131 is added to the aerosol, transported to the mouthpiece portion 130, and inhaled into the mouth of the user.

Figure 2:
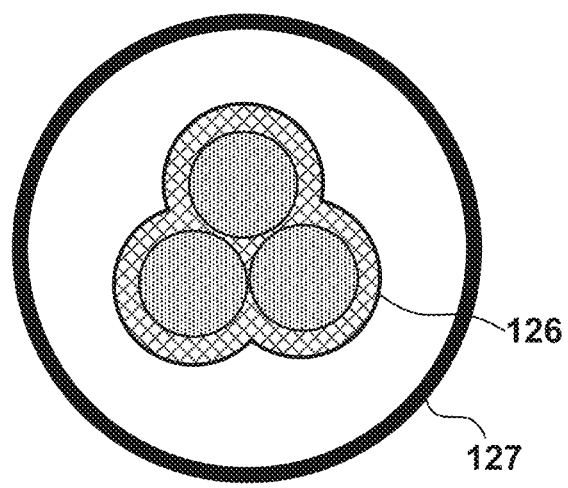
FIG. 2 is a view for explaining an arrangement example of a heater according to the embodiment of the present invention.

The sectional structure of the heater 127 and the transport portion 126 shown in FIG. 1 will be described with reference to FIG. 2. The heater 127 shown in FIG. 1 has a coil shape. The inside of the coil is the heating area by the heater 127. FIG. 2 shows the sectional structure of the heater 127 and the transport portion 126 viewed from the axial direction of the coil. As shown in FIG. 2, the heater 127 and the transport portion 126 have a clearance between them. For this reason, heat emitted from the heater 127 to the transport portion 126 decreases until reaching the transport portion 126. Hence, the temperature of the outer surface of the transport portion 126 is lower than the temperature of the heater 127. In addition, the temperature of the aerosol source arranged inside the transport portion 126 is lower than the temperature of the outer surface of the transport portion 126. Although the heater 127 has a coil shape in the example shown in FIG. 1, the heater 127 may have another shape such as a meandering shape, a cylindrical shape, or a blade shape. Regardless of the shape of the heater 127, the heat from the heater 127 is lost due to the clearance between the heater 127 and the transport portion 126. Even if the clearance between the heater 127 and the transport portion 126 is very narrow or 0, a clearance is formed between heater 127 and the aerosol source inside the transport portion 126 because the aerosol source on the outer surface of the transport portion 126 is preferentially heated by the heater 127.

If the temperature of the heater 127 is too low, the aerosol generation amount is insufficient. If the temperature of the heater 127 is too high, the aerosol generation amount is excessive. In both cases, an unintended flavor is given to the user. The present inventors found by various experiments that the temperature of the heater 127 during heating of the aerosol source may be set within the range of 210° C. (inclusive) to 230° C. (exclusive) in order to give an intended flavor to the user using the inhalation device 100 having the structure shown in FIG. 1. A detailed arrangement of the electric component 110 configured to maintain the temperature of the heater 127 within this range after the temperature of the heater 127 during heating falls within this range will be described.

Figure 3:
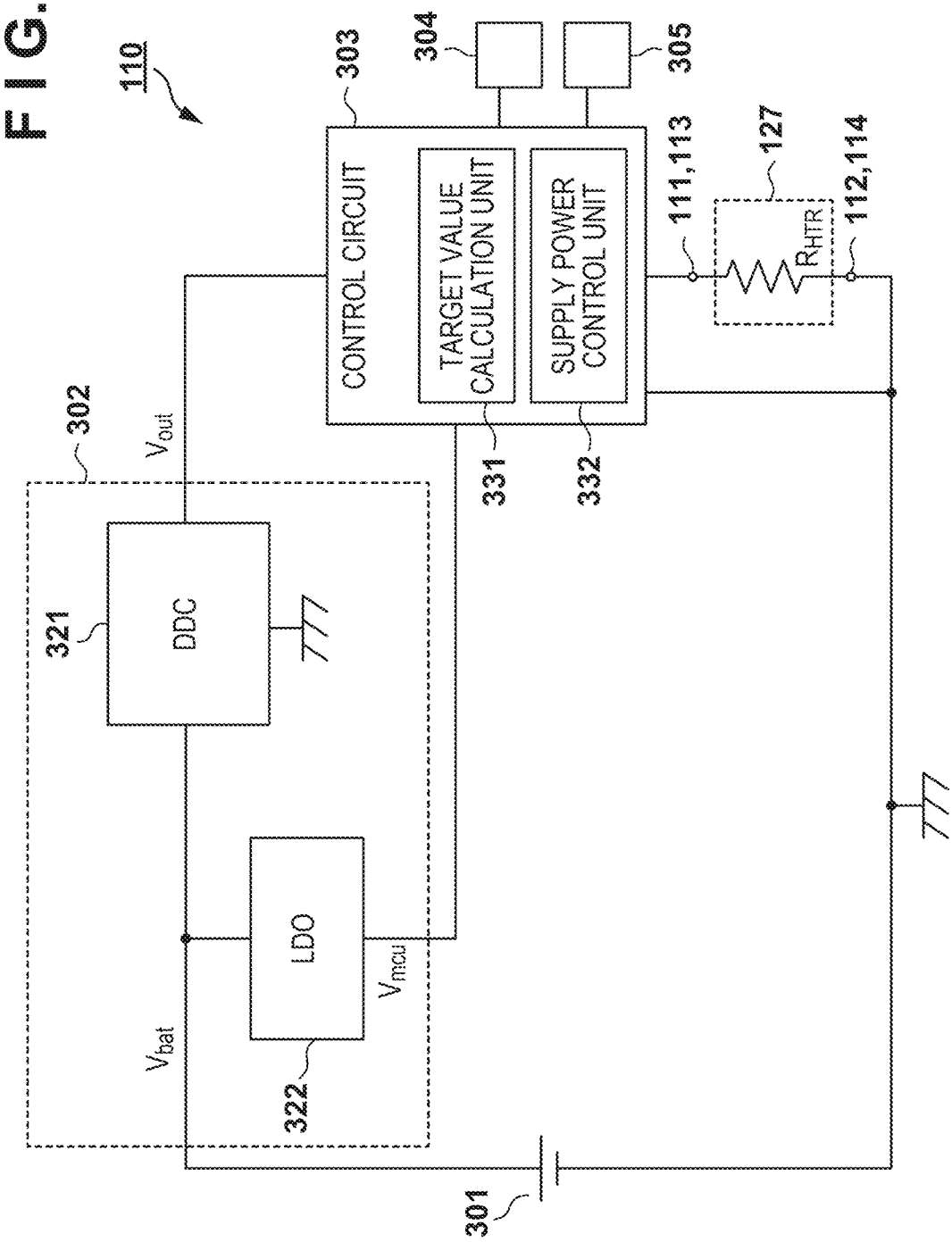
FIG. 3 is a view for explaining an arrangement example of an electric component according to the embodiment of the present invention.

FIG. 3 shows an arrangement example of the electric component 110. The electric component 110 may include a power supply (for example, a battery) 301, a voltage generation circuit 302 that generates power to be supplied to (the heater 127 of) the atomizer 104, and a control circuit 303 that controls the power to be supplied to (the heater 127 of) the atomizer 104. A resistance value $R_{HTR}$ of the heater 127 changes depending on the temperature of the heater 127. For example, the resistance value $R_{HTR}$ of the heater 127 has a positive correlation with the temperature of the heater 127.

The voltage generation circuit 302 may include, for example, a voltage converter (voltage regulator) 321 that converts a power supply voltage $V_{bat}$ supplied from the power supply 301 into a heater driving voltage $V_{out}$. Also, the voltage generation circuit 302 may include a voltage conversion circuit 322 such as an LDO (Low DropOut) that converts the power supply voltage $V_{bat}$ into a voltage $V_{mcu}$ for an MCU (microcontroller unit) in the control circuit 303.

The control circuit 303 performs overall control of the electric component 110. As a part of the control, the control circuit 303 performs feedback control such that the temperature of the heater 127 during heating of the aerosol source falls within the range of 210° C. (inclusive) to 230° C. (exclusive). More specifically, before the user starts using the inhalation device 100, a target value calculation unit 331 of the control circuit 303 calculates the target value of a physical amount correlated with the temperature of the heater 127, and stores the target value in a memory. The physical amount may be a voltage applied to the heater 127, as will be described later. The target value is set such that the temperature of the heater 127 during heating of the aerosol source falls within the range of 210° C. (inclusive) to 230° C. (exclusive). After that, during use of the inhalation device 100 by the user, a supply power control unit 332 of the control circuit 303 monitors the physical amount, and controls power supplied from the voltage generation circuit 302 to the heater 127 of the atomizer 104 such that the physical amount under monitoring approaches the target value.

The electric component 110 may further include a temperature sensor 304 that detects the temperature of a predetermined portion of the electric component 110, and a puff sensor (for example, a pressure sensor) 305 that detects a puff operation of the user. The temperature sensor 304 may be incorporated in the puff sensor 305 or the power supply 301.

Figure 4A:
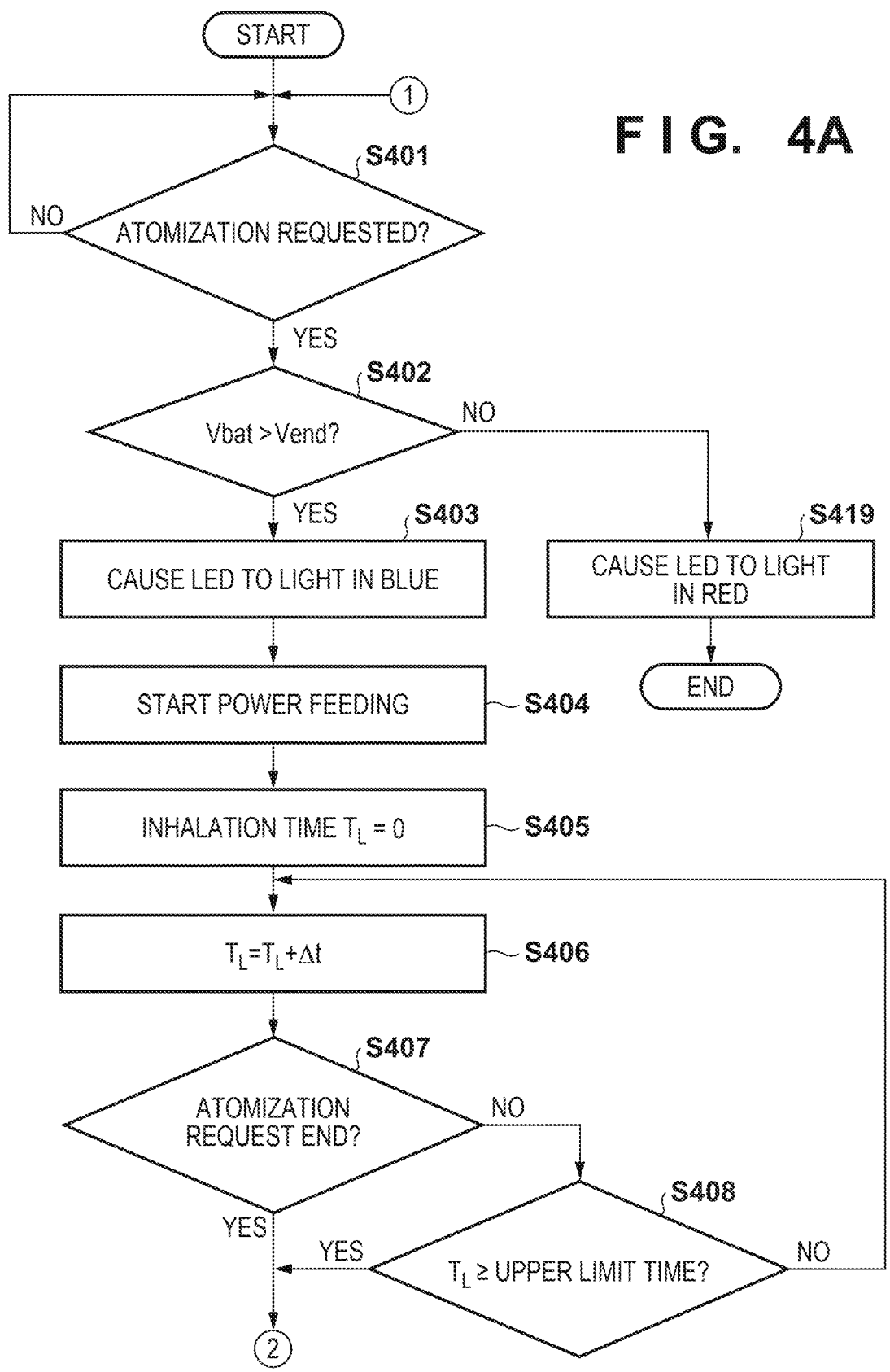
FIGS. 4A and 4B are views for explaining an operation example of the electric component according to the embodiment of the present invention.
Figure 4B:
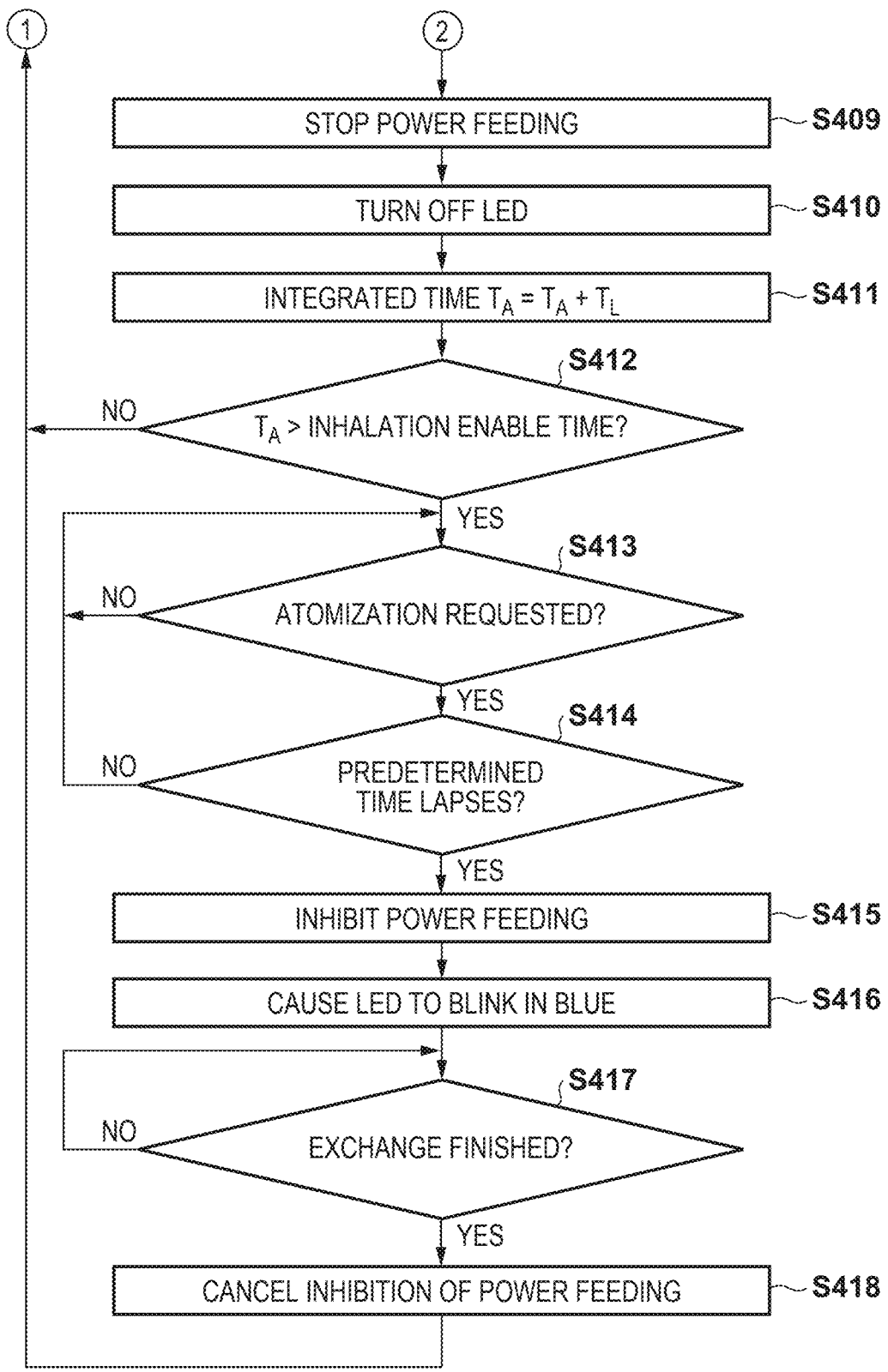

FIGS. 4A and 4B show the operation of the inhalation device 100. This operation is controlled by the control circuit 303. The control circuit 303 includes a memory that stores a program, and a processor that operates in accordance with the program. The operation shown in FIGS. 4A and 4B may be processed by executing the program in the memory by the processor.

In step S401, the control circuit 303 waits for reception of an atomization request, and upon receiving an atomization request, executes step S402. The atomization request is a request for operating the atomizer 104, more specifically, controlling the heater 127 within a target temperature range to generate an aerosol from the aerosol source. The atomization request may be an operation of detecting, by the puff sensor 305, that the user has performed the inhalation operation (puff operation) via the mouthpiece portion 130, and notifying, by the puff sensor 305, the control circuit 303 of the detection. Alternatively, the atomization request may be an operation of notifying, by the operation unit OP, the control circuit 303 that the user has operated the operation unit OP.

In step S402, the control circuit 303 acquires the power supply voltage $V_{bat}$ from a power supply management circuit (not shown), and determines whether the power supply voltage $V_{bat}$ is higher than a discharge end voltage Vend (for example, 3.2 V). That the power supply voltage $V_{bat}$ is equal to or lower than the discharge end voltage Vend means that the remaining dischargeable amount of the power supply 301 is not sufficient. Hence, if the power supply voltage $V_{bat}$ is equal to or lower than the discharge end voltage Vend, in step S419, the control circuit 303 makes a notification to promote charge of the power supply 301 using the display unit DISP of the user interface 116. If the display unit DISP includes an LED, this notification may be causing the LED to light in red. If the power supply voltage $V_{bat}$ is higher than the discharge end voltage Vend, in step S403, using the display unit DISP of the user interface 116, the control circuit 303 may make a notification representing that a normal operation is possible. If the display unit DISP includes an LED, this notification may be causing the LED to light in blue.

Next to step S403, in step S404, the control circuit 303 starts feed control for the heater 127. Feed control for the heater 127 includes temperature control of controlling the heater 127 within a target temperature range. Details of the temperature control will be described later.

Next, in step S405, the control circuit 303 resets an inhalation time $T_L$ to 0. After that, in step S406, the control circuit 303 adds Δt to the inhalation time $T_L$. At corresponds to the time interval between execution of step S406 and the next execution of step S406.

Next, in step S407, the control circuit 303 determines whether the atomization request has ended. If the atomization request has ended, in step S409, the control circuit 303 stops feed control for the heater 127. On the other hand, if the atomization request has not ended, in step S408, the control circuit 303 determines whether the inhalation time $T_L$ (for example, 2.0 to 2.5 sec) has reached an upper limit time. If the inhalation time $T_L$ has not reached the upper limit time, the process returns to step S406.

Next to step S409, in step S410, the control circuit 303 turns off the LED that is lighting in blue. Next, in step S411, the control circuit 303 updates an integrated time $T_A$. More specifically, in step S411, the inhalation time $T_L$ is added to the integrated time $T_A$ at the current point of time. The integrated time $T_A$ may be an integrated time when the capsule 106 was used for inhalation, in other words, an integrated time when the aerosol was inhaled via the flavor source 131 of the capsule 106.

In step S412, the control circuit 303 determines whether the integrated time $T_A$ is not more than an inhalation enable time (for example, 120 sec). If the integrated time $T_A$ is not more than the inhalation enable time, this means that the capsule 106 may still provide the flavor substance. In this case, the process returns to step S401. If the integrated time $T_A$ is more than the inhalation enable time, in step S413, the control circuit 303 waits for generation of the atomization request. If the atomization request is generated, in step S414, the control circuit 303 waits for continuation of the atomization request for a predetermined time. After that, in step S415, the control circuit 303 inhibits feed control for the heater 127. Note that step S414 may be omitted.

Next, in step S416, using the display unit DISP of the user interface 116, the control circuit 303 may make a notification to promote exchange of the capsule 106. If the display unit DISP includes an LED, this notification may be causing the LED to blink in blue (repeat on/off). Hence, the user may exchange the capsule 106. In an example, one atomizer 104 and a plurality of (for example, five) capsules 106 may be sold as one set. In this example, after one atomizer 104 and all capsules 106 in one set are consumed, the atomizer 104 and the last capsule 106 in the consumed set may be exchanged with an atomizer 104 and a capsule 106 of a new set.

In step S417, the control circuit 303 waits for the exchange of the capsule 106 (or the capsule 106 and the atomizer 104). In step S418, the control circuit 303 cancels inhibition of feed control for the heater 127 and returns to step S401.

Figure 5:
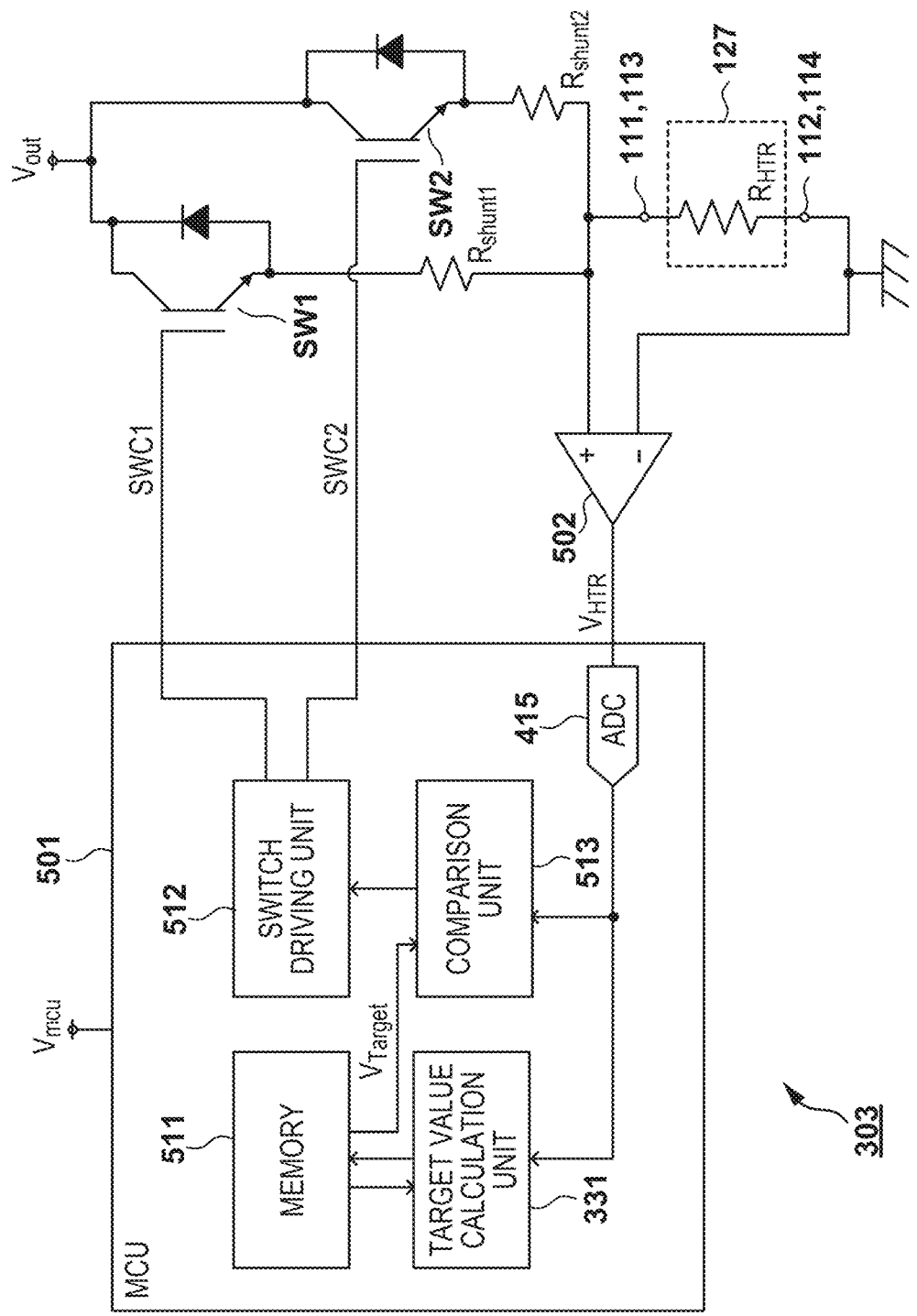
FIG. 5 is a view for explaining a control circuit according to the first arrangement example of the present invention.

The first arrangement example of the control circuit 303 configured to feedback-control the heater 127 will be described next with reference to FIG. 5. The control circuit 303 may include an MCU 501, switches SW1 and SW2, shunt resistors $R_{shunt1}$ and $R_{shunt2}$, and an operational amplifier 502. The MCU 501 may include a memory 511, a switch driving unit 512, the target value calculation unit 331, a comparison unit 513, and an ADC (analog/digital converter) 415. The switch driving unit 512, the target value calculation unit 331, and the comparison unit 513 may be implemented by a general-purpose processor, a dedicated circuit, or a combination thereof. The supply power control unit 332 is formed by the switches SW1 and SW2, the shunt resistors $R_{shunt1}$ and $R_{shunt2}$, the switch driving unit 512, and the comparison unit 513.

The switch SW1 and the shunt resistor $R_{shunt1}$ are connected in series between the heater 127 and the supply line of the heater driving voltage $V_{out}$ from the voltage generation circuit 302. The resistance value of the shunt resistor $R_{shunt1}$ will be expressed as $R_{shunt1}$, like the reference symbol. This also applies to the other resistors to be described below. In the example shown in FIG. 5, the shunt resistor $R_{shunt1}$ is connected between the switch SW1 and the heater 127. Instead, the switch SW1 may be connected between the shunt resistor $R_{shunt1}$ and the heater 127.

The switch SW1 may be formed by, for example, a transistor, more specifically, an FET (Field Effect Transistor) or an IGBT (Insulated Gate Bipolar Transistor). A case in which various switches such as the switch SW1 are formed by FETs will be described below. However, the FET may be formed by an IGBT or another switch. A control signal SWC1 is supplied from the switch driving unit 512 to the control terminal of the switch SW1 (for example, the gate of the FET). The switch SW1 is turned on/off in accordance with the value of the control signal SWC1. A control signal that turns on the switch SW1 (that is, a conductive state) is called an ON signal, and a control signal that turns off the switch SW1 (that is, a nonconductive state) is called an OFF signal. The ON signal is, for example, high level, and the OFF signal is, for example, low level. This also applies to the control signals of the other switches to be described below.

The switch SW2 and the shunt resistor $R_{shunt2}$ are connected in series between the heater 127 and the supply line of the heater driving voltage $V_{out}$ from the voltage generation circuit 302. The resistance value of the shunt resistor $R_{shunt2}$ is much larger than the resistance value of the shunt resistor $R_{shunt1}$. In the example shown in FIG. 5, the shunt resistor $R_{shunt2}$ is connected between the switch SW2 and the heater 127. Instead, the switch SW2 may be connected between the shunt resistor $R_{shunt2}$ and the heater 127. The switch SW2 may be formed by, for example, a transistor, more specifically, an FET or an IGBT. A control signal SWC2 is supplied from the switch driving unit 512 to the control terminal of the switch SW2 (for example, the gate of the FET). The switch SW2 is turned on/off in accordance with the value of the control signal SWC2.

The operational amplifier (differential amplifier) 502 includes a noninverting input terminal, an inverting input terminal, and an output terminal. The noninverting input terminal of the operational amplifier 502 is connected to one terminal (more specifically, the third electrical contact 113) of the heater 127. The inverting input terminal of the operational amplifier 502 is connected to the other terminal (more specifically, the fourth electrical contact 114) of the heater 127. The output terminal of the operational amplifier 502 is connected to the input terminal of the ADC 415. The operational amplifier 502 thus supplies a voltage $V_{HTR}$ applies to the heater 127 to the ADC 415. In the first arrangement example shown in FIG. 5, the control circuit 303 monitors the output of the operational amplifier 502, that is, the voltage $V_{HTR}$ as the physical amount correlated with the temperature of the heater. The control circuit 303 controls power supplied to the heater 127 such that the voltage $V_{HTR}$ approaches the target value.

A method of calculating a target value $V_{Target}$ of the voltage $V_{HTR}$ will be described. The control circuit 303 may perform the operation of calculating the target value $V_{Target}$ in a state in which the heater 127 is not heated, for example, before step S404 in FIG. 4A. First, the control circuit 303 turns off the switch SW1, and turns on the switch SW2. A current flows from the supply line of the heater driving voltage $V_{out}$ to ground via the switch SW2, the shunt resistor $R_{shunt2}$, and the heater 127.

The target value calculation unit 331 receives the voltage $V_{HTR}$ applied to the heater 127 in a digital form from the ADC 415. The target value calculation unit 331 calculates the target value $V_{Target}$ in accordance with equations (1) and (2), and stores the target value $V_{Target}$ in the memory 511 in a digital form. Other values to be described below, which are stored in the memory 511, are also stored in a digital form.

$$R_{Ref} = \frac{V_{OUT}}{V_{out} - V_{HTR}} \cdot R_{Shunt2} \quad (1)$$

$$V_{Target} = \frac{\{1 + \alpha \cdot 10^{-6}(T_{Target} - T_{Ref})\} \cdot R_{Ref}}{R_{Shunt2} + \{1 + \alpha \cdot 10^{-6}(T_{Target} - T_{ref})\} \cdot R_{Ref}} \cdot V_{out} \quad (2)$$

In equations (1) and (2), $\alpha$, $V_{HTR}$, and $R_{shunt2}$ are predetermined values, and are written in the memory 511 at the time of, for example, manufacturing. $R_{Ref}$ is the resistance value of the heater 127 at a temperature $T_{Ref}$ when measuring the voltage $V_{HTR}$. $R_{Ref}$ is called a reference resistance value, and the temperature $T_{Ref}$ is called a reference temperature. The temperature of the heater 127 when acquiring the reference resistance value may be decided based on the temperature of an arbitrary portion in the inhalation device 100 (for example, a temperature detected by the temperature sensor 304) or room temperature. $\alpha$ is the temperature coefficient [ppm/° C.] of the heater 127. $\alpha$ is a value determined by the material or size of the heater 127, and is written in the memory 511 at the time of, for example, manufacturing.

$T_{Target}$ is the target temperature of the heater 127 during heating of the aerosol source. The target temperature $T_{Target}$ is set at the time of, for example, manufacturing and written in the memory 511. The target value $V_{Target}$ corresponds to the voltage $V_{HTR}$ when the temperature of the heater 127 is the target temperature $T_{Target}$. The target temperature $T_{Target}$ is set to, for example, 220° C. within the range of 210° C. (inclusive) to 230° C. (exclusive). When feedback control is performed such that the voltage $V_{HTR}$ approaches the target value $V_{Target}$, the temperature of the heater 127 also varies to approach the target temperature $T_{Target}$. In this way, the target value $V_{Target}$ is set such that the temperature of the heater 127 during heating of the aerosol source falls within the range of 210° C. (inclusive) to 230° C. (exclusive).

In the above-described example, the target value $V_{Target}$ is calculated divisionally by equations (1) and (2), as described above. However, the target value calculation unit 331 may calculate the target value $V_{Target}$ in accordance with an equation formed by integrating these equations.

Figure 6:
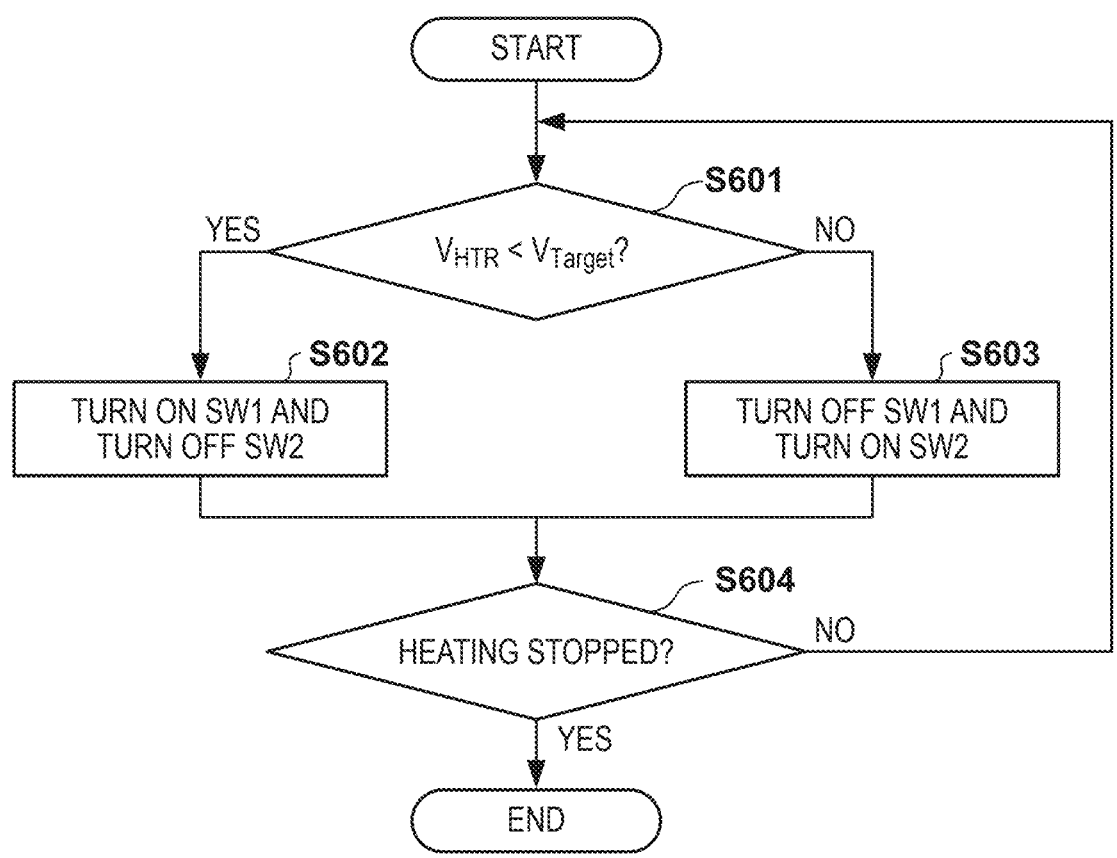
FIG. 6 is a view for explaining the operation of the control circuit according to the first arrangement example of the present invention.

Feedback control of the temperature of the heater 127 will be described next with reference to FIG. 6. The control circuit 303 executes this feedback control during inhalation by the user (for example, during steps S404 to S409 in FIGS. 4A and 4B). During execution of this operation, the comparison unit 513 compares the target value $V_{Target}$ in a digital form, which is read out from the memory 511, with the voltage $V_{HTR}$ received from the ADC 415 in a digital form, and continuously supplies the comparison result to the switch driving unit 512. In this way, the comparison unit 513 monitors the voltage $V_{HTR}$ applied to the heater 127.

In step S601, the switch driving unit 512 turns off the switch SW1 by supplying an OFF signal as the control signal SWC1, and turns on the switch SW2 by supplying an ON signal as the control signal SWC2. After that, the switch driving unit 512 determines, based on the output from the comparison unit 513, whether the voltage $V_{HTR}$ is lower than the target value $V_{Target}$. If this condition is satisfied ("YES" in step S601), the switch driving unit 512 makes the process transition to step S602. Otherwise ("NO" in step S601), the switch driving unit 512 makes process transition to step S603.

In step S602, the switch driving unit 512 turns on the switch SW1 by supplying an ON signal as the control signal SWC1, and turns off the switch SW2 by supplying an OFF signal as the control signal SWC2. If the ON signal is already supplied to the switch SW1, the switch driving unit 512 maintains the state. If the OFF signal is already supplied to the switch SW2, the switch driving unit 512 maintains the state. This state is maintained until the comparison result of the comparison unit 513 changes. Hence, a current flows from the supply line of the heater driving voltage $V_{out}$ to ground via the switch SW1, the shunt resistor $R_{shunt1}$, and the heater 127. On the other hand, no current flows to the path that passes through the switch SW2. When the current flows to the heater 127 via the shunt resistor $R_{shunt1}$, power necessary for heating the heater 127 is supplied, and the temperature of the heater 127 rises. The shunt resistor $R_{shunt1}$ has a resistance value that supplies a current capable of raising the temperature of the heater 127.

In step S603, the switch driving unit 512 turns off the switch SW1 by supplying an OFF signal as the control signal SWC1, and turns on the switch SW2 by supplying an ON signal as the control signal SWC2. If the ON signal is already supplied to the switch SW2, the switch driving unit 512 maintains the state. If the OFF signal is already supplied to the switch SW1, the switch driving unit 512 maintains the state. This state is maintained until the comparison result of the comparison unit 513 changes. Hence, a current flows from the supply line of the heater driving voltage $V_{out}$ to ground via the switch SW2, the shunt resistor $R_{shunt2}$, and the heater 127. On the other hand, no current flows to the path that passes through the switch SW1. Since the shunt resistance $R_{shunt2}$ is sufficiently large, power necessary for heating the heater 127 is not suppled, and the temperature of the heater 127 lowers. That is, the shunt resistor $R_{shunt2}$ has a resistance value that supplies a current capable of lowering the temperature of the heater 127. If the resistance value of the shunt resistor $R_{shunt2}$ is sufficiently large, the power supplied to the heater 127 is substantially zero.

In step S604, the switch driving unit 512 determines whether to end heating processing. If this condition is satisfied ("YES" in step S604), the switch driving unit 512 ends the processing. Otherwise ("NO" in step S604), the switch driving unit 512 makes the process transition to step S601. The condition for ending the heating processing is a condition to transition to step S409 in FIG. 4B described above.

As described above, the control circuit 303 controls the power supplied to the heater 127 such that the voltage $V_{HTR}$ approaches the target value $V_{Target}$. More specifically, based on the comparison result between the voltage $V_{HTR}$ under monitoring and the target value $V_{Target}$, the control circuit 303 switches the supply amount of power from the voltage generation circuit 302 to the atomizer 104. As described above, since the target value $V_{Target}$ is set such that the temperature of the heater 127 becomes the target temperature $T_{Target}$, the temperature of the heater 127 during heating of the aerosol source is maintained within the range of 210° C. (inclusive) to 230° C. (exclusive) by the feedback control. Step S601 described above branches to NO if an equality holds. Instead, the step may branch to YES. In addition, the control circuit 303 performs feedback control by directly comparing the voltage $V_{HTR}$ under monitoring with the target value $V_{Target}$ without converting the voltage $V_{HTR}$ into another value. Hence, the follow-up property in feedback control increases. As a result, even if the aerosol source in the heating area of the heater 127 is exhausted, and the thermal capacity of the heating target largely changes, the control circuit 303 may maintain the temperature of the heater within the range of 210° C. (inclusive) to 230° C. (exclusive).

Figure 7:
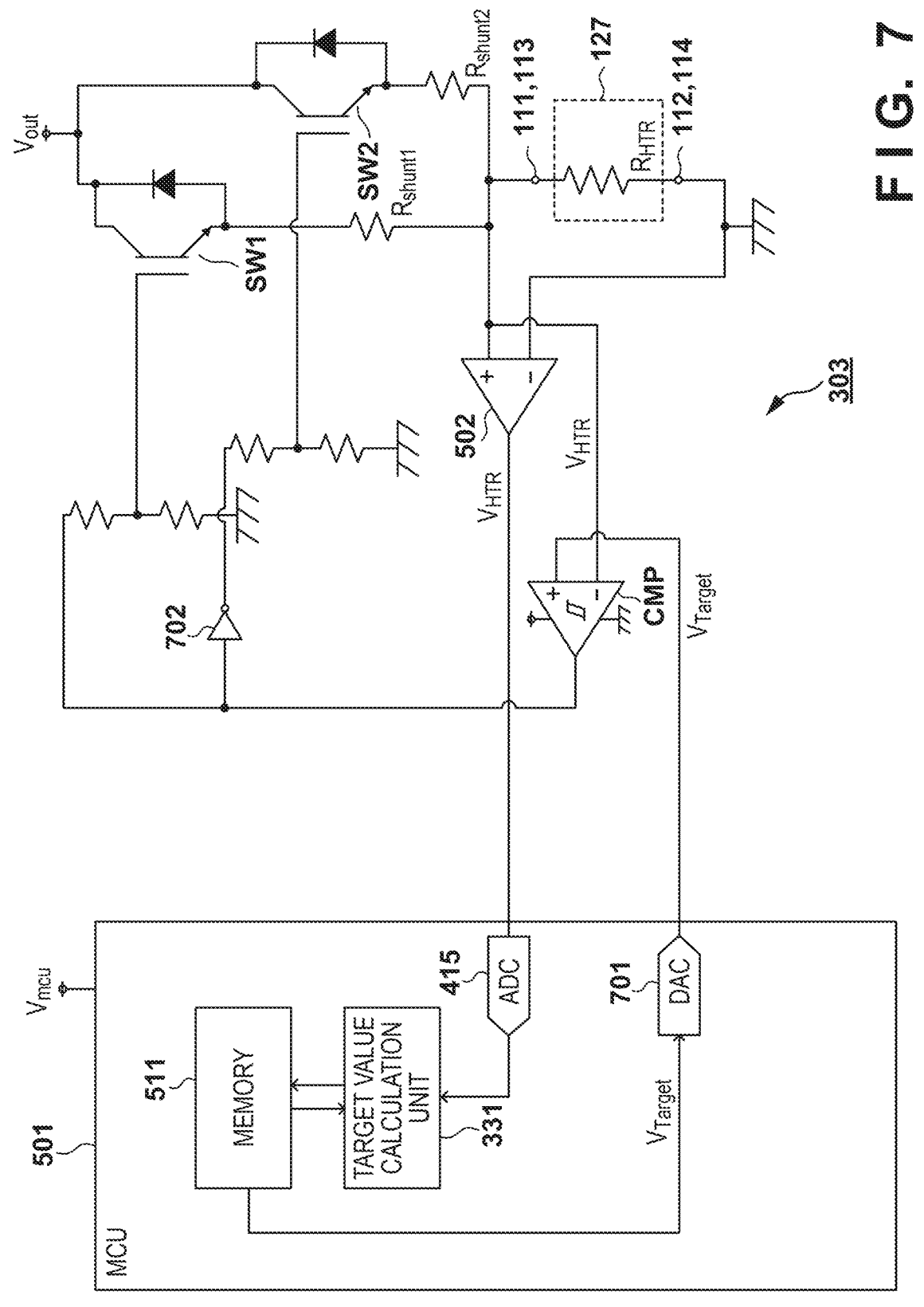

The second arrangement example of the control circuit 303 configured to feedback-control the heater 127 will be described next with reference to FIG. 7. In the second arrangement example, feedback control that is executed by the MCU 501 in the first arrangement example shown in FIG. 5 is executed by an analog circuit. Differences from the first arrangement example will mainly be described below.

As compared to the control circuit 303 according to the first arrangement example, the control circuit 303 according to the second arrangement example further includes a comparator CMP, and an inverter 702 for logic inversion. Also, the MCU 501 according to the second arrangement example does not include the switch driving unit 512 and the comparison unit 513, and includes a DAC (digital/analog converter) 701.

The inverting input terminal of the comparator CMP is connected to an end portion (that is, the third electrical contact 113) of the heater 127 on the side of the supply line of the heater driving voltage $V_{out}$. Hence, the voltage $V_{HTR}$ applied to the heater 127 is supplied to the inverting input terminal of the comparator CMP. The target value $V_{Target}$ in an analog form is supplied from the MCU 501 (more specifically, the DAC 701) to the noninverting input terminal of the comparator CMP. Hence, the comparator CMP outputs the comparison result between the voltage $V_{HTR}$ and the target value $V_{Target}$. That is, the comparator CMP monitors the voltage $V_{HTR}$ as the physical amount correlated with the temperature of the heater 127.

The output signal from the comparator CMP is supplied to the control terminal of the switch SW1 via a voltage dividing circuit. Also, the output signal from the comparator CMP is supplied to the control terminal of the switch SW2 via the inverter 702 and a voltage dividing circuit. Note that both or one of these voltage dividing circuits may be omitted. The DAC 701 reads out the target value $V_{Target}$ in a digital form from the memory 511, converts it into an analog form, and supplies it to the comparator CMP.

In the second arrangement example, the method of deciding the target value $V_{Target}$ is the same as in the first arrangement example, and a description thereof will be omitted. Feedback control of the temperature of the heater 127 in the second arrangement example will be described. The control circuit 303 executes this feedback control during inhalation by the user (for example, during steps S404 to S409 in FIGS. 4A and 4B).

To start power supply to the heater 127, the DAC 701 reads out the target value $V_{Target}$ from the memory 511, converts it into an analog form, and continuously supplies it to the comparator CMP. Immediately after the inhalation, the temperature of the heater 127 is low, and therefore, the voltage $V_{HTR}$ is low. Hence, the comparator CMP outputs a high-level signal as a comparison result. As a result, the high-level signal is supplied to the control terminal of the switch SW1, and the switch SW1 is turned on. In addition, a low-level signal obtained by logic inversion by the inverter 702 is supplied to the control terminal of the switch SW2, and the switch SW2 is turned off. A current thus flows to the heater 127, and the temperature of the heater 127 rises, as in the first arrangement example.

When the temperature of the heater 127 rises, and the voltage $V_{HTR}$ exceeds the target value $V_{Target}$, the comparator CMP outputs a low-level signal as a comparison result. As a result, the low-level signal is supplied to the control terminal of the switch SW1, and the switch SW1 is turned off. In addition, a high-level signal obtained by logic inversion by the inverter 702 is supplied to the control terminal of the switch SW2, and the switch SW2 is turned on. A current thus flows to the heater 127, and the temperature of the heater 127 lowers, as in the first arrangement example. After that, when the voltage $V_{HTR}$ falls below the target value $V_{Target}$, power is supplied to the heater 127 such that the temperature of the heater 127 rises.

As described above, the control circuit 303 controls the power to be supplied to the heater 127 such that the voltage $V_{HTR}$ approaches the target value $V_{Target}$. In the second arrangement example, the analog circuit (more specifically, the comparator CMP) that is not included in the MCU 501 performs magnitude comparison between the voltage $V_{HTR}$ and the target value $V_{Target}$. Hence, power control may be performed without being restricted by the operation clock of the MCU 501. This makes it possible to perform control at a higher speed. Additionally, since the MCU 501 does not perform the magnitude comparison, the processing burden on the MCU 501 decreases.

Figure 8:
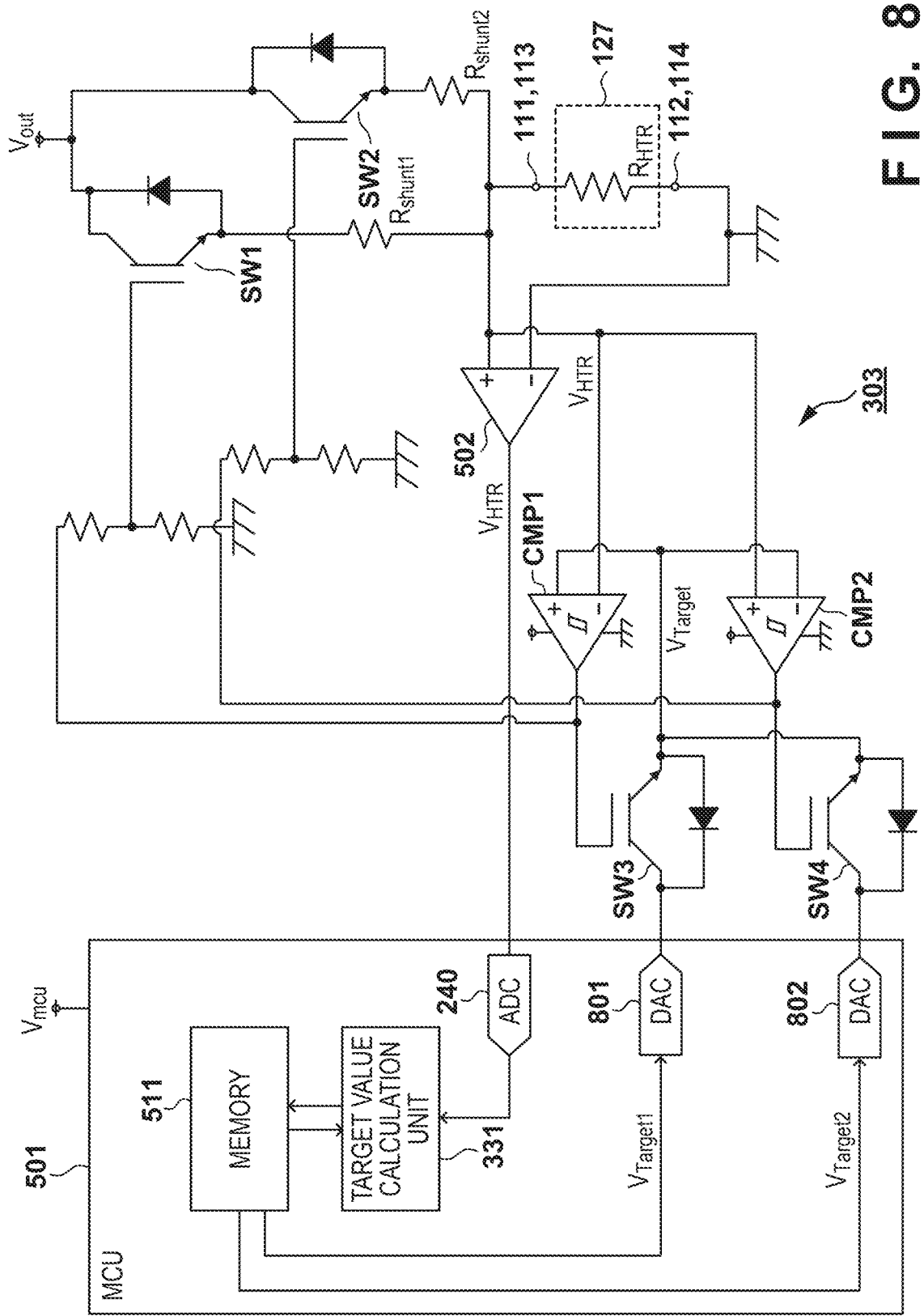
FIG. 8 is a view for explaining a control circuit according to the third arrangement example of the present invention.

The third arrangement example of the control circuit 303 configured to feedback-control the heater 127 will be described next with reference to FIG. 8. The second arrangement example shown in FIG. 7 includes one system of a comparator. However, the third arrangement example includes two systems of comparators. Differences from the second arrangement example will mainly be described below.

As compared to the control circuit 303 according to the second arrangement example, the control circuit 303 according to the third arrangement example does not include the comparator CMP and the inverter 702, and includes comparators CMP1 and CMP2 and switches SW3 and SW4. Also, the MCU 501 according to the third arrangement example does not include the DAC 701, and includes DACs 801 and 802.

The inverting input terminal of the comparator CMP1 is connected to an end portion (that is, the third electrical contact 113) of the heater 127 on the side of the supply line of the heater driving voltage $V_{out}$. Hence, the voltage $V_{HTR}$ applied to the heater 127 is supplied to the inverting input terminal of the comparator CMP1. The target value $V_{Target}$ in an analog form is supplied to the noninverting input terminal of the comparator CMP1. Hence, the comparator CMP1 outputs the comparison result between the voltage $V_{HTR}$ and the target value $V_{Target}$. The output signal from the comparator CMP1 is supplied to the control terminal of the switch SW1 via a voltage dividing circuit.

The noninverting input terminal of the comparator CMP2 is connected to the end portion (that is, the third electrical contact 113) of the heater 127 on the side of the supply line of the heater driving voltage $V_{out}$. Hence, the voltage $V_{HTR}$ applied to the heater 127 is supplied to the noninverting input terminal of the comparator CMP2. The target value $V_{Target}$ in an analog form is supplied to the inverting input terminal of the comparator CMP2. Hence, the comparator CMP2 outputs the comparison result between the voltage $V_{HTR}$ and the target value $V_{Target}$. The output signal from the comparator CMP2 is supplied to the control terminal of the switch SW2 via a voltage dividing circuit. The comparator CMP1 and the comparator CMP2 which are configured as described above output signals of levels different from each other.

The DAC 801 reads out a target value $V_{Target1}$ in a digital form from the memory 511, converts it into an analog form, and supplies it to the comparators CMP1 and CMP2 via the switch SW3. The DAC 802 reads out a target value $V_{Target2}$ in a digital form from the memory 511, converts it into an analog form, and supplies it to the comparators CMP1 and CMP2 via the switch SW4. Since the comparator CMP1 and the comparator CMP2 output signals of levels different from each other, only one of the switches SW3 and SW4 is turned on. For this reason, if the switch SW3 is on (that is, the switch SW4 is off), the target value $V_{Target1}$ is supplied to the comparators CMP1 and CMP2 as the target value $V_{Target}$. If the switch SW4 is on (that is, the switch SW3 is off), the target value $V_{Target2}$ is supplied to the comparators CMP1 and CMP2 as the target value $V_{Target}$.

The target value $V_{Target1}$ is the target value of the voltage $V_{HTR}$ when the switch SW1 is on, and the switch SW2 is off. The target value $V_{Target2}$ is the target value of the voltage $V_{HTR}$ when the switch SW1 is off, and the switch SW2 is on. The target value calculation unit 331 calculates these target values in accordance with equation (1) described above and equations (3) and (4) below, and stores them in the memory 511. Like the calculation of the target value $V_{Target1}$, the target value calculation unit 331 may calculate the target value $V_{Target2}$ based on the voltage $V_{HTR}$ that is received in a digital form from the ADC 415 and applied to the heater 127 in a state in which the switch SW1 is off, and the switch SW2 is on.

$$V_{Target1} = \frac{\{1 + \alpha \cdot 10^{-6}(T_{Target} - T_{Ref})\} \cdot R_{Ref}}{R_{Shunt1} + \{1 + \alpha \cdot 10^{-6}(T_{Target} - T_{ref})\} \cdot R_{Ref}} \cdot V_{out} \quad (3)$$

$$V_{Target2} = \frac{\{1 + \alpha \cdot 10^{-6}(T_{Target} - T_{Ref})\} \cdot R_{Ref}}{R_{Shunt2} + \{1 + \alpha \cdot 10^{-6}(T_{Target} - T_{ref})\} \cdot R_{Ref}} \cdot V_{out} \quad (4)$$

In equations (3) and (4), $\alpha$, $V_{out}$, $R_{shunt1}$, and $R_{shunt2}$ are predetermined values, and are written in the memory 511 at the time of, for example, manufacturing. The target temperature $T_{Target}$ has been described above concerning equation (2). Since $R_{Shunt1} > R_{Shunt2}$, $V_{Target1} < V_{Target2}$.

As in the first arrangement example, the target value calculation unit 331 calculates the reference resistance value $R_{Ref}$ in accordance with equation (1), and applies this value to equations (3) and (4), thereby calculating the target value $V_{Target1}$ and target value $V_{Target2}$.

Feedback control of the temperature of the heater 127 in the third arrangement example will be described. The control circuit 303 executes this feedback control during inhalation by the user (for example, during steps S404 to S409 in FIGS. 4A and 4B).

To start power supply to the heater 127, the DAC 801 reads out the target value $V_{Target1}$ from the memory 511, converts it into an analog form, and continuously supplies it to the switch SW3. Also, the DAC 802 reads out the target value $V_{Target2}$ from the memory 511, converts it into an analog form, and continuously supplies it to the switch SW4. Assume that the switch SW3 is on, and the switch SW4 is off at this point of time. For this reason, the target value $V_{Target1}$ is supplied as the target value $V_{Target}$ to the comparators CMP1 and CMP2.

Immediately after the inhalation, the temperature of the heater 127 is low, and therefore, the voltage $V_{HTR}$ is low. Hence, the comparator CMP1 outputs a high-level signal as a comparison result, and the comparator CMP2 outputs a low-level signal as a comparison result. As a result, the high-level signal is supplied to the control terminal of the switch SW1 and the control terminal of the switch SW3, and the switches SW1 and SW3 are turned on. In addition, the low-level signal is supplied to the control terminal of the switch SW2 and the control terminal of the switch SW4, and the switches SW2 and SW4 are turned off. A current thus flows to the heater 127, and the temperature of the heater 127 rises, as in the first arrangement example. In addition, the target value $V_{Target1}$ is continuously supplied as the target value $V_{Target}$ to the comparators CMP1 and CMP2.

When the temperature of the heater 127 rises, and the voltage $V_{HTR}$ exceeds the target value $V_{Target}$, the comparator CMP1 outputs a low-level signal as a comparison result, and the comparator CMP2 outputs a high-level signal as a comparison result. As a result, the low-level signal is supplied to the control terminal of the switch SW1 and the control terminal of the switch SW3, and the switches SW1 and SW3 are turned off. In addition, the high-level signal is supplied to the control terminal of the switch SW2 and the control terminal of the switch SW4, and the switches SW2 and SW4 are turned on. A current thus flows to the heater 127, and the temperature of the heater 127 lowers, as in the first arrangement example. In addition, the target value $V_{Target2}$ is supplied as the target value $V_{Target}$ to the comparators CMP1 and CMP2. After that, when the voltage $V_{HTR}$ falls below the target value $V_{Target}$, power is supplied to the heater 127 such that the temperature of the heater 127 rises.

As described above, the control circuit 303 controls the power to be supplied to the heater 127 such that the voltage $V_{HTR}$ approaches the target value $V_{Target}$. In the third arrangement example, since the value of the target value $V_{Target}$ is switched depending on whether the temperature of the heater 127 is rising or lowering, finer feedback control may be performed.

Figure 9:
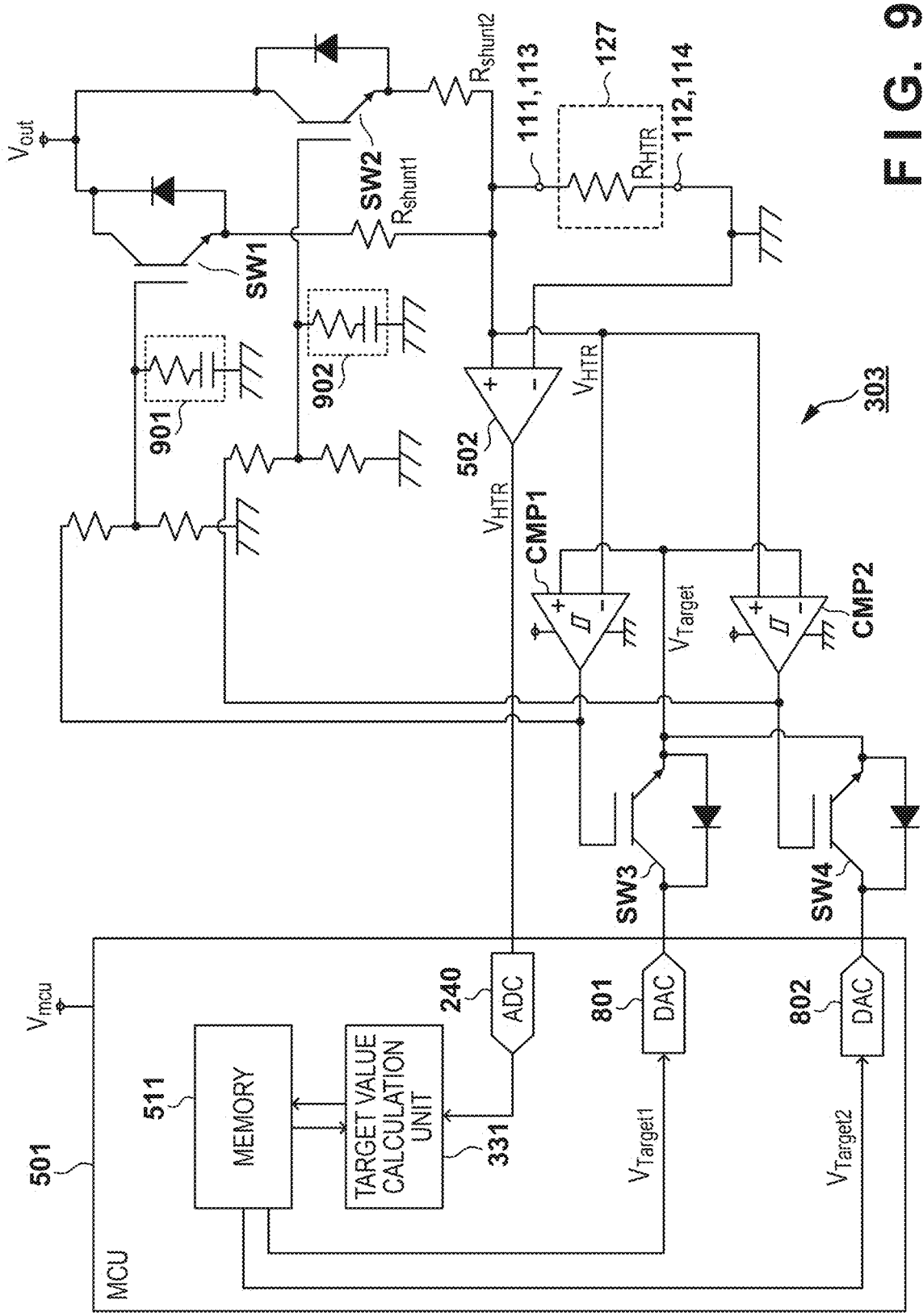
FIG. 9 is a view for explaining a control circuit according to the fourth arrangement example of the present invention.

The fourth arrangement example of the control circuit 303 configured to feedback-control the heater 127 will be described next with reference to FIG. 9. As compared to the third arrangement example, the fourth arrangement example further includes delay circuits 901 and 902. Differences from the third arrangement example will mainly be described below.

The delay circuit 901 is connected to a node between the output terminal of the comparator CMP1 and the control terminal of the switch SW1. The delay circuit 902 is connected to a node between the output terminal of the comparator CMP2 and the control terminal of the switch SW2. By the delay circuits 901 and 902, the speed of switching may be adjusted. This may smooth the temperature change of the heater 127 and make the life of the switches SW1 and SW2 long.

Figure 10:
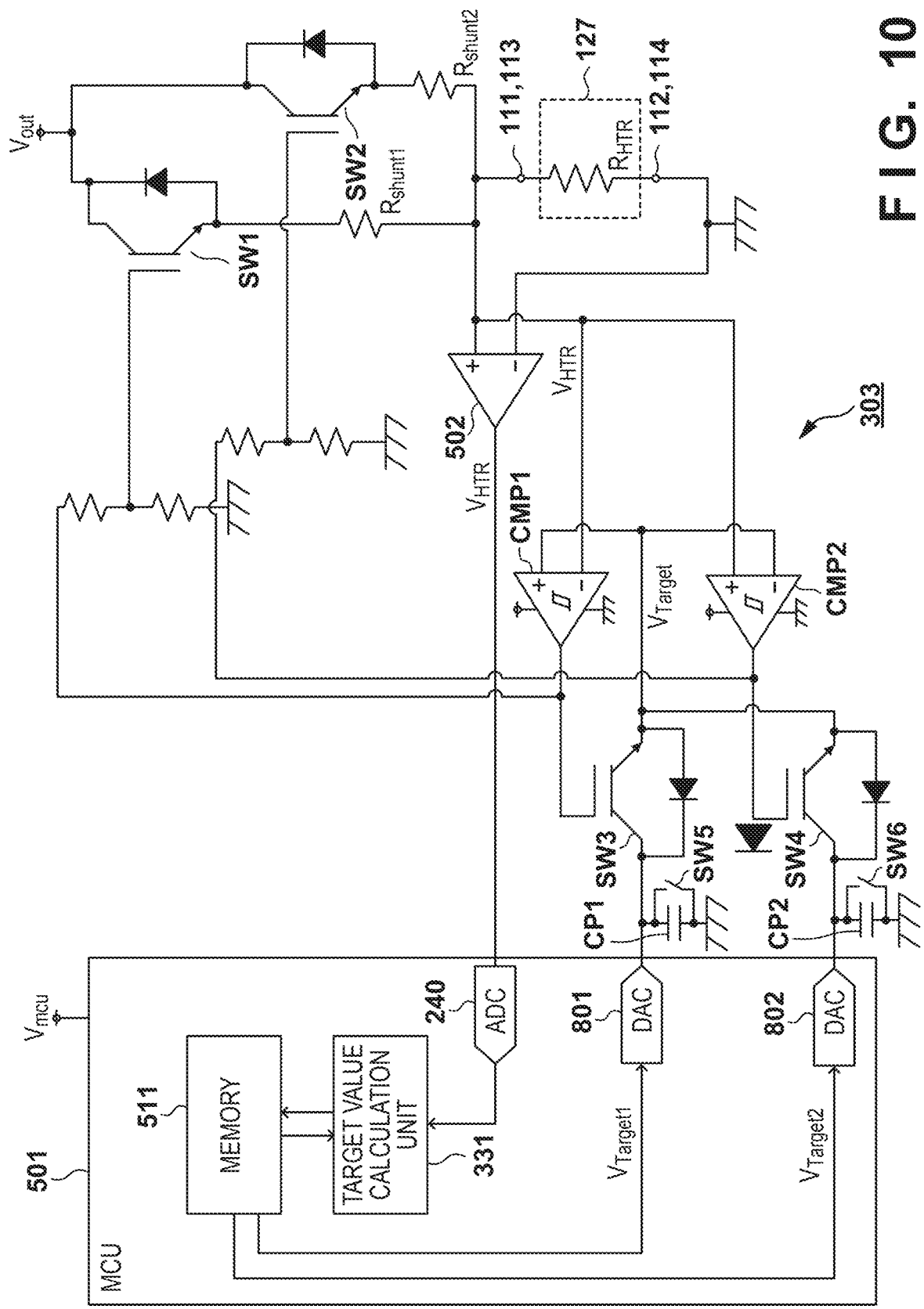
FIG. 10 is a view for explaining a control circuit according to the fifth arrangement example of the present invention.

The fifth arrangement example of the control circuit 303 configured to feedback-control the heater 127 will be described next with reference to FIG. 10. As compared to the third arrangement example, the fifth arrangement example further includes capacitors CP1 and CP2, and switches SW5 and SW6. Differences from the third arrangement example will mainly be described below.

The capacitor CP1 is connected to a node between the microcontroller 501 (more specifically, the DAC 801) and the switch SW3. The switch SW5 is connected in parallel to the capacitor CP1. The capacitor CP1 may hold the target value $V_{Target1}$ in an analog form output from the DAC 801. For this reason, after the capacitor CP1 holds the target value $V_{Target1}$ output from the DAC 801, the MCU 501 may stop the DAC 801. If the value of the target value $V_{Target1}$ is updated, the MCU 501 turns on the switch SW5 to reset the value held by the capacitor CP1, and after that, causes the capacitor CP1 to hold the updated target value $V_{Target1}$.

The capacitor CP2 is connected to a node between the microcontroller 501 (more specifically, the DAC 802) and the switch SW4. The switch SW6 is connected in parallel to the capacitor CP2. The capacitor CP2 may hold the target value $V_{Target2}$ in an analog form output from the DAC 802. The remaining functions of the capacitor CP2 are the same as the functions of the capacitor CP1. According to the fifth arrangement example, involvement of the MCU 501 in the feedback control may further be reduced, and the burden on the MCU 501 further decreases.

Figure 11:
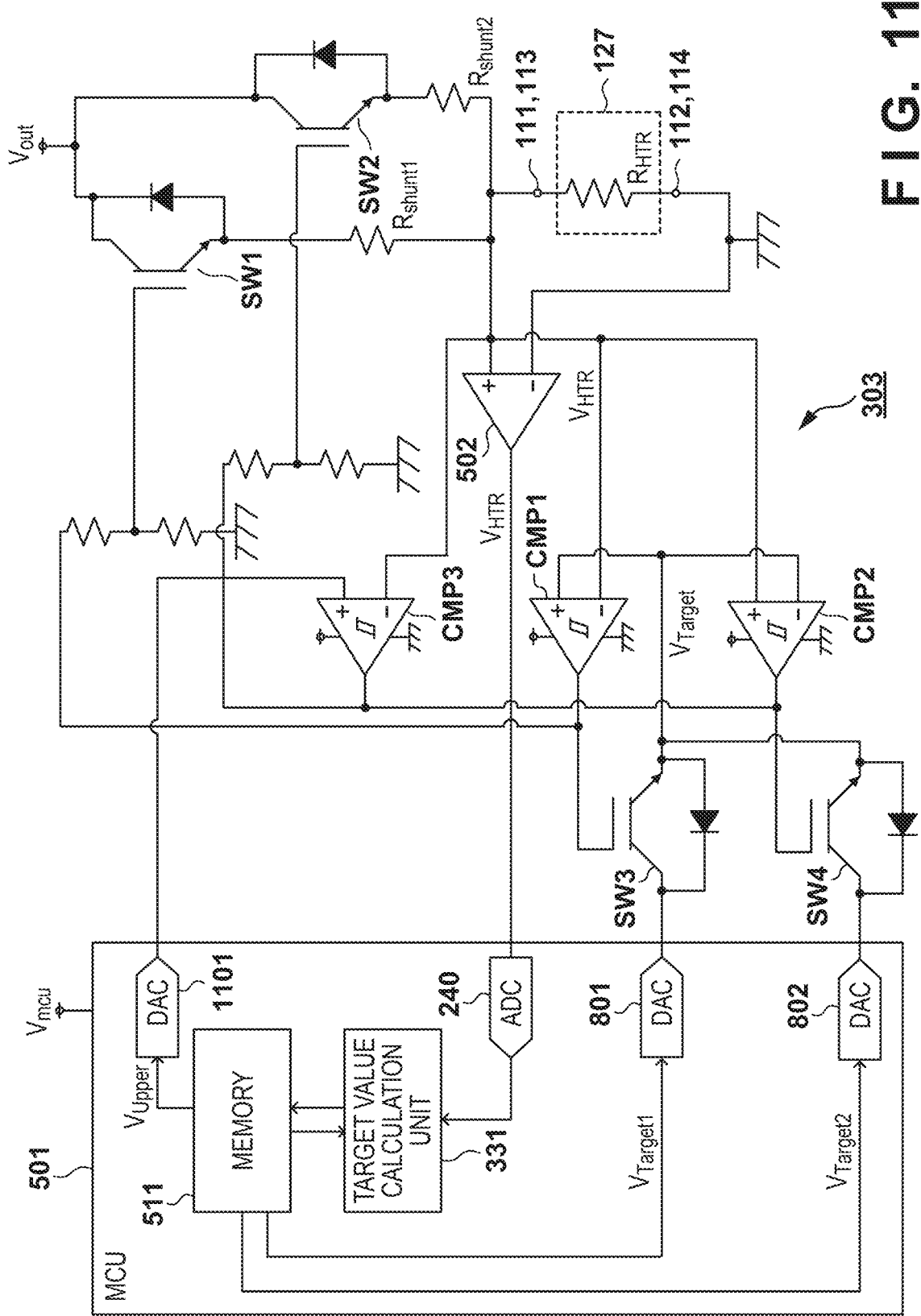
FIG. 11 is a view for explaining a control circuit according to the sixth arrangement example of the present invention.

The sixth arrangement example of the control circuit 303 configured to feedback-control the heater 127 will be described next with reference to FIG. 11. As compared to the third arrangement example, the sixth arrangement example further includes a comparator CMP3, and a DAC 1101. Differences from the third arrangement example will mainly be described below.

The inverting input terminal of the comparator CMP3 is connected to an end portion (that is, the third electrical contact 113) of the heater 127 on the side of the supply line of the heater driving voltage $V_{out}$. Hence, the voltage $V_{HTR}$ applied to the heater 127 is supplied to the inverting input terminal of the comparator CMP3. An upper limit value $V_{Upper}$ in an analog form is supplied to the noninverting input terminal of the comparator CMP3. Hence, the comparator CMP3 outputs the comparison result between the voltage $V_{HTR}$ and the upper limit value $V_{Upper}$. The output signal from the comparator CMP3 is supplied to the control terminal of the switch SW2 via a voltage dividing circuit. The voltage dividing circuit connected to the control terminal of the switch SW2 is configured to supply a low-level signal to the control terminal of the switch SW2 if at least one of the output of the comparator CMP2 and the output of the comparator CMP3 is low level, and supply a high-level signal to the control terminal of the switch SW2 if both the output of the comparator CMP2 and the output of the comparator CMP3 are high level.

The upper limit value $V_{Upper}$ is set to be equal to the voltage $V_{HTR}$ when the temperature of the heater 127 is 230° C. or more, and stored in the memory 511. The upper limit value $V_{Upper}$ is a value higher than all of the above-described target values $V_{Target}$. If the voltage $V_{HTR}$ under monitoring is less than the upper limit value $V_{Upper}$, the output signal of the comparator CMP3 is high level. In this case, power is supplied to the heater 127, as in the third arrangement example.

If the voltage $V_{HTR}$ under monitoring reaches the upper limit value $V_{Upper}$, a low-level signal is supplied to the control terminal of the switch SW1, and the low-level signal is supplied to the control terminal of the switch SW2 as well. Hence, supply of the power from the voltage generation circuit 302 to the atomizer 104 stops. As described above, according to the sixth arrangement example, overheating of the heater 127 is suppressed.

The seventh arrangement example of the control circuit 303 configured to feedback-control the heater 127 will be described next with reference to FIG. 12. As compared to the third arrangement example, the seventh arrangement example does not include the operational amplifier 502, the target value calculation unit 331, an ADC 240, and the DACs 801 and 802, and includes resistors R1 to R4.

The resistors R1 and R2 form a voltage dividing circuit. The resistance values of the resistors R1 and R2 are set such that the voltage of a node between the resistor R1 and the resistor R2 becomes the target value $V_{Target1}$. More specifically, the resistors R1 and R2 have resistance values according to $$\frac{R_2}{R_1 + R_2} = \frac{\{1 + \alpha \cdot 10^{-6}(T_{Target} - T_{ref})\} \cdot R_{Ref}}{R_{Shunt1} + \{1 + \alpha \cdot 10^{-6}(T_{Target} - T_{Ref})\} \cdot R_{Ref}} \cdot V_{out} \quad (5)$$

The node between the resistor R1 and the resistor R2 is connected to the switch SW3. When the switch SW3 is turned on, the target value $V_{Target1}$ is supplied as the target value $V_{Target}$ from the voltage dividing circuit formed by the resistors R1 and R2 to the comparators CMP1 and CMP2 via the switch SW3. The value of the target value $V_{Target1}$ may be decided using another inhalation device 100 including the control circuit 303 of the above-described third arrangement example, and the resistance values of the resistors R1 and R2 may be decided using this value.

The resistors R3 and R4 form a voltage dividing circuit. The resistance values of the resistors R3 and R4 are set such that the voltage of a node between the resistor R3 and the resistor R4 becomes the target value $V_{Target2}$. More specifically, the resistors R3 and R4 have resistance values according to $$\frac{R_4}{R_3 + R_4} = \frac{\{1 + \alpha \cdot 10^{-6}(T_{Target} - T_{ref})\} \cdot R_{Ref}}{R_{Shunt2} + \{1 + \alpha \cdot 10^{-6}(T_{Target} - T_{Ref})\} \cdot R_{Ref}} \cdot V_{out} \quad (6)$$

The node between the resistor R3 and the resistor R4 is connected to the switch SW4. When the switch SW4 is turned on, the target value $V_{Target2}$ is supplied as the target value $V_{Target}$ from the voltage dividing circuit formed by the resistors R3 and R4 to the comparators CMP1 and CMP2 via the switch SW4. The value of the target value $V_{Target2}$ may be decided using another inhalation device 100 including the control circuit 303 of the above-described third arrangement example, and the resistance values of the resistors R3 and R4 may be decided using this value.

Figure 12:
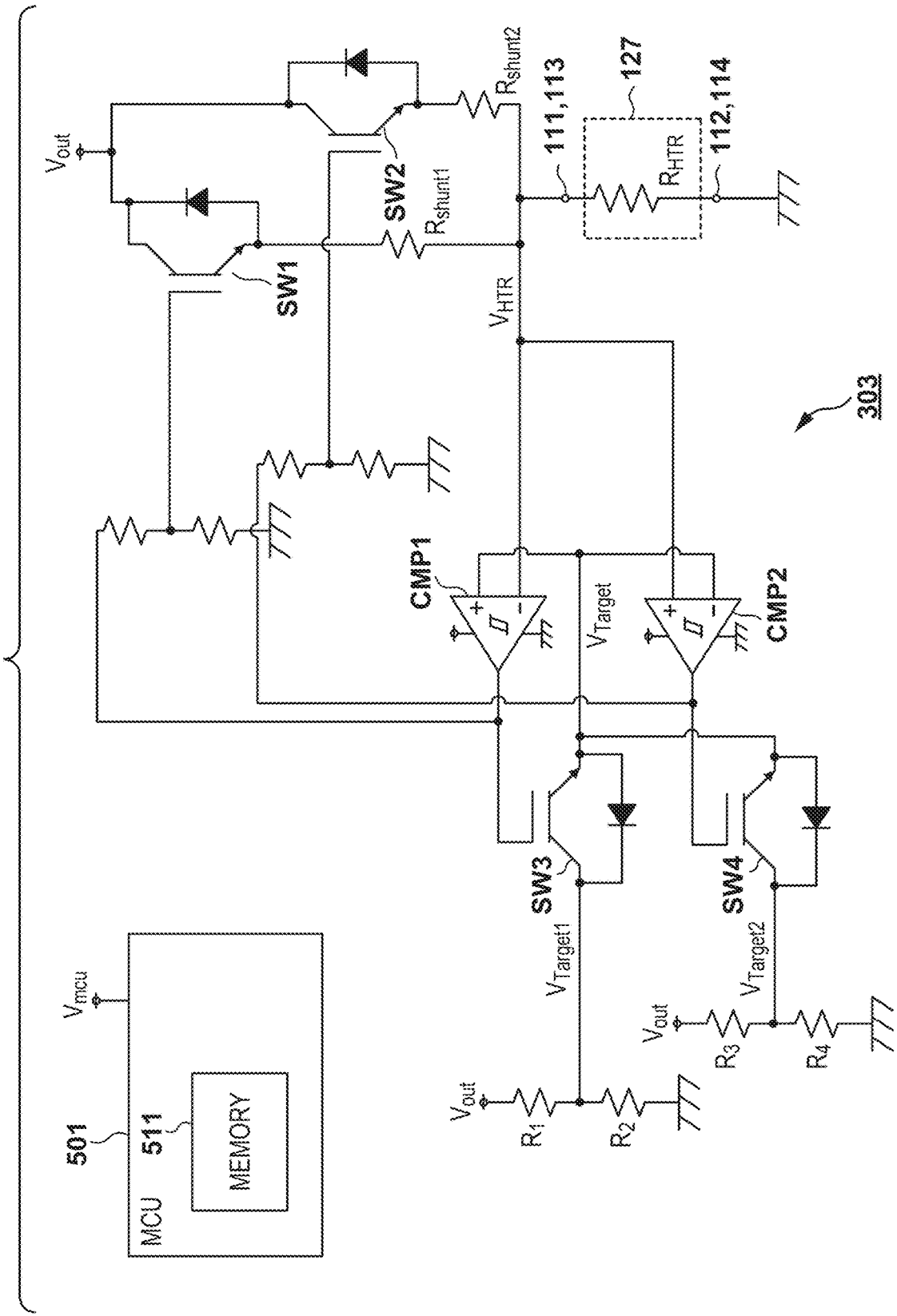
FIG. 12 is a view for explaining a control circuit according to the seventh arrangement example of the present invention.

Although the MCU 501 is shown in FIG. 12, the MCU 501 is not involved in feedback control of the temperature of the heater 127 in the seventh arrangement example. In other words, the control circuit 303 that performs feedback control of the temperature of the heater 127 does not include the MCU 501 that is a digital circuit, and includes an analog circuit. More specifically, the control circuit 303 that performs feedback control of the temperature of the heater 127 includes only an analog circuit. According to this arrangement example, the processing burden on the MCU 501 may further be reduced.

In all the control circuits according to the first to seventh arrangement examples of the present invention, the switch SW1, the switch SW2, the shunt resistor $R_{shunt1}$, and the shunt resistor $R_{shunt2}$ are provided between the heater 127 and the supply line of the heater driving voltage $V_{out}$ from the voltage generation circuit 302. Instead, the switch SW1, the switch SW2, the shunt resistor $R_{shunt1}$, and the shunt resistor $R_{shunt2}$ may be provided between ground and the heater 127.

The invention is not limited to the foregoing embodiments, and various variations/changes are possible within the spirit of the invention.

What is claimed is:

1. An inhalation device controller configured to control an atomizer including a container configured to hold an aerosol source of a liquid, a heater, and a transport portion configured to transport the aerosol source from the container to a heating area by the heater, the controller comprising
    a control circuit configured to monitor a voltage at a first terminal of the heater and configured to control power to be supplied to the atomizer such that the voltage at the first terminal under monitoring approaches a target value, the control circuit including
    an operational amplifier including a noninverting input terminal connected to a first terminal of the heater, and an inverting input terminal connected to a second terminal of the heater; and
    a microcontroller configured to compare an output of the operational amplifier, which is converted into a digital form, with the target value stored in a digital form in a memory to monitor the output of the operational amplifier as the voltage at the first terminal of the heater,
    wherein the target value is set such that a temperature of the heater during heating of the aerosol source falls within a range of 210° C. to 230° C.

2. The controller according to claim 1, wherein the control circuit switches a supply amount of the power to the atomizer based on an output from a comparator arranged to receive the voltage at the first terminal of the heater under monitoring and the target value.

3. The controller according to claim 1, wherein the control circuit is configured such that the temperature of the heater falls within the range 210° C. to 230° C. even when the aerosol source does not exist in the heating area.

4. The controller according to claim 1, wherein when the voltage at the first terminal of the heater under monitoring reaches a value representing that the temperature of the heater is not less than 230° C., the control circuit stops the supply of the power to the atomizer.

5. The controller according to claim 1, wherein the microcontroller calculates the target value based on the output of the operational amplifier in a state in which the heater is not heated, and stores the target value in the memory.

6. The controller according to claim 1, further comprising a voltage generation circuit configured to generate the power to be supplied to the atomizer,
    wherein the control circuit further includes a transistor connected between the voltage generation circuit and the heater, and
    the microcontroller supplies a signal based on a comparison result between the output of the operational amplifier and the target value to a control terminal of the transistor.

7. The controller according to claim 1, further comprising a voltage generation circuit configured to generate the power to be supplied to the atomizer, wherein
    the control circuit includes:
    a first resistor and a first transistor, which are connected in series to the first terminal of the heater;
    a second resistor and a second transistor, which are connected in series to the first terminal of the heater;

a first comparator including a noninverting input terminal to which the target value is supplied, and an inverting input terminal connected to the first terminal of the heater;

a second comparator including a noninverting input terminal connected to the first terminal of the heater, and an inverting input terminal to which the target value is supplied, a resistance value of the second resistor is higher than a resistance value of the first resistor, an output of the first comparator is supplied to a control terminal of the first transistor, and an output of the second comparator is supplied to a control terminal of the second transistor.

* * * * *